UNITED STATES PATENT OFFICE

WALTER SEIDEL, OF LEVERKUSEN, NEAR COLOGNE-ON-THE-RHINE, GERMANY, ASSIGNOR TO I. G. FARBENINDUSTRIE AKTIENGESELLSCHAFT, OF FRANKFORT-ON-THE-MAIN, GERMANY

PROCESS FOR THE MANUFACTURE OF CHROME ALUM

No Drawing. Application filed July 21, 1926, Serial No. 124,102, and in Germany September 29, 1925.

In carrying out the customary processes for the manufacture of chrome alum from chromium hydroxide or from chromium sulfate waste lyes as they are obtainable by oxidizing intermediate products of organic dyestuffs by means of chromic acid and chromate the process of crystallization requires a period of from 4–6 weeks. Already several attempts have been made in order to accelerate the crystallization by the addition of the most varied substances (see for example German Patent No. 265,045 according to which sulfurous acid is added), without however achieving complete success.

According to the present invention a sulfate solution is obtained in a period of a few hours, from which by rapid cooling chrome alum will crystallize immediately in an amount sufficient to render the process of great technical value. This result is obtained by strong acidification of the solution and heating to about 30–45° C. for several hours.

With the aid of my new process it is now possible to carry out the known crystallization of potassium chrome alum continuously in an economic manner, heretofore impossible, since without my new treatment only a small quantity of the blue modification of the alum present in the solution would separate from the green solution in such a short time. Moreover in processes of this kind requiring a long time the requisite apparatus becomes prohibitively large.

Example

A chromium sulfate solution, containing about 130 grams of $Cr_2O_3$ per litre and an amount of sulfuric acid rendering such a solution 8–9 times normal, is heated to 45° C.; then the temperature is allowed to drop to 38° C., said drop from 45 to 38° C. being extended over a few hours in any suitable manner. Then the requisite amount of potassium sulfate is added and the resulting solution is cooled and caused to crystallize in a short time by means of stirring or by keeping the solution in motion. The remaining strongly acid mother liquor is employed in a new cycle of operations.

I claim:—

A process for the production of chrome alum from chromium sulfate solutions, which comprises adding to such a solution an amount of sulfuric acid sufficient to render the acidity of the solution eight to nine times normal, heating the acidified solution for several hours at between 30° to 45° C., adding potassium sulfate in requisite amount to the solution after the termination of the heat treatment, and causing the chrome alum to crystallize by keeping the solution in motion.

In testimony whereof, I have hereunto set my hand.

WALTER SEIDEL.